(12) United States Patent
Leander et al.

(10) Patent No.: US 12,341,783 B2
(45) Date of Patent: Jun. 24, 2025

(54) ACCESS CONTROL ENFORCEMENT ARCHITECTURES FOR DYNAMIC MANUFACTURING SYSTEMS

(71) Applicant: ABB Schweiz AG, Baden (CH)

(72) Inventors: Björn Leander, Västerås (SE); Tomas Lindstrom, Västerås (SE)

(73) Assignee: ABB Schweiz AG, Baden (CH)

( * ) Notice: Subject to any disclaimer, the term of this patent is extended or adjusted under 35 U.S.C. 154(b) by 213 days.

(21) Appl. No.: 18/162,683

(22) Filed: Jan. 31, 2023

(65) Prior Publication Data

US 2023/0254320 A1  Aug. 10, 2023

(30) Foreign Application Priority Data

Feb. 7, 2022  (EP) ..................................... 22155487

(51) Int. Cl.
*H04L 9/40* (2022.01)

(52) U.S. Cl.
CPC ............ *H04L 63/105* (2013.01); *H04L 63/20* (2013.01)

(58) Field of Classification Search
None
See application file for complete search history.

(56) References Cited

U.S. PATENT DOCUMENTS

2017/0295197 A1 * 10/2017 Parimi .................... G06N 20/00
2019/0158491 A1 * 5/2019 Burmester .......... H04L 63/0861

OTHER PUBLICATIONS

Sandhu, R. S., et al.; "Role-based access control models"; Computer, vol. 29, No. 2; IEEE; Feb. 1996.
Hardt, D.; "The OAuth 2.0 Authorization Framework"; Internet Engineering Task Force {IETF}; Request for Comments {RFC} 6749; Oct. 2012; 76 Pages.
Seifert, Tim, et al.; "Small Scale, Modular and Continuous: A New Approach in Plant Design"; Chemical Engineering and Processing: Process Intensification, vol. 52; Feb. 2012; 11 Pages.
Hu, Vincent. C., et al.; "Guide to Attribute Based Access Control (ABAC) Definition and Considerations"; Technical Report, National Institute of Standards and Technology, NIST Special Publication 800-162; Jan. 2014; 47 Pages.
Ferraiolo, D., et al; "Policy Machine: Features, Architecture and Specification"; National Institute of Standards and Technology (NIST), White Paper, NISTIR 7987, Revision 1; Oct. 2015; 126 Pages.

(Continued)

*Primary Examiner* — Cai Y Chen
(74) *Attorney, Agent, or Firm* — Whitmyer IP Group LLC (57) ABSTRACT

A computer system including: one or more resource servers with resources, to which access is controlled in accordance with an access-control policy specified in a computer-readable access-control language, and a centralized authorization server, which is common to the resource servers and implements a second-type policy decision point. The computer system further includes a first-type policy decision point, which is implemented by the authorization server and configured to decide on dynamic policy privileges, and one or more second-type policy decision points, which are implemented by respective ones of the resource servers and configured to decide on static policy privileges.

19 Claims, 6 Drawing Sheets

(56) References Cited

OTHER PUBLICATIONS

Jones, M., et al.; "JSON Web Encryption (JWE)"; Internet Engineering Task Force (IETF); Request for Comments (RFC) 7516, May 2015; 51 Pages.
Jones, M., et al.; "JSON Web Signature (JWS)"; Internet Engineering Task Force (IETF); Request for Comments (RFC): 7515; May 2015; 59 Pages.
Jones, M., et al.; "JSON Web Token (JWT)"; Internet Engineering Task Force (IETF); Request for Comments (RFC) 7519; May 2015; 30 Pages.
Ferraiolo D., et al.; "Extensible Access Control Markup Language (XACML) and Next Generation Access Control (NGAC)"; ABAC '16: Proceedings of the 2016 ACM International Workshop on Attribute Based Access Control; Mar. 11, 2016; 12 Pages.
Ladiges, Jan, et al.; "Integration of Modular Process Units Into Process Control Systems"; IEEE Transactions on Industry Applications, vol. 54 Issue: 2; Mar. 2018; 11 Pages.
Zvei; "Process Industrie 4.0: The Age of Modular Production (Achema 2018)"; German Electrical and Electronic Manufacturers Association; White Paper, Frankfurt, Germany, 2019; 2 Pages.
Watson, Venesa, et al.; "Secure Granular Interoperability with OPC UA"; Informatik 2019 Workshops: 50 Jahre Gesellschaft fr Informatik—Informatik fr Gesellschaft (Workshop-Beitrge), Bonn; 2019; 12 Pages.
Leander, Björn, et al.; "A recipe-based algorithm for access control in modular automation systems"; Technical Report; Sep. 2020; 10 Pages.
Leander, Björn, et al.; "Access Control for Smart Manufacturing Systems*"; European Conference on Software Architecture; Springer International Publishing; Sep. 7, 2020; 14 Pages.
Martinelli, F., et al; "Improving security in industry 4.0 by extending OPC-UA with usage control"; ARES '20: Proceedings of the 15th International Conference on Availability, Reliability and Security; ACM, Article No. 96; Ireland; Aug. 25, 2020; 11 Pages.
Chandramouli, Ramaswamy, et al.; "Attribute-based Access Control for Microservices-based Applications Using a Service Mesh"; NIST, National Institute of Standards and Technology; Gaithersburg, MD; Aug. 2021.
Dramé-Maigné, S., et al.; "Centralized, Distributed, and Everything in between: Reviewing Access Control Solutions for the IoT"; ACM Computing Surveys, vol. 54, No. 7; 2021; 34 Pages.
Leander, Björn, et al.; "A Questionnaire Study on the Use of Access Control in Industrial Systems"; 2021 26th IEEE International Conference on Emerging Technologies and Factory Automation (ETFA); Vasteras, Sweden; Sep. 7, 2021; 8 Pages.
Leander, Björn, et al.; "Toward an Ideal Access Control Strategy for Industry 4.0 Manufacturing Systems"; IEEE Access, vol. 9; Aug. 13, 2021; 14 Pages.
Sudarsan, S. V., et al.; "Survey on Delegated and Self-Contained Authorization Techniques in CPS and IoT"; IEEE Access, vol. 9, Jun. 29, 2021.
OPC Foundation; "IEC 62541 OPC Unified Architecture, rev 1.05," standard, International Electrotechnical Commission, Geneva, CH; Nov. 1, 2022; 31 Pages.

* cited by examiner

ACCESS CONTROL ENFORCEMENT ARCHITECTURES FOR DYNAMIC MANUFACTURING SYSTEMS

TECHNICAL FIELD

The present disclosure relates to the field of cybersecurity mechanisms within industrial automation and control systems (IACS). A number of access-control enforcement architectures practically useful for dynamically changing access control scenarios are presented. Further, it is shown by way of an implementation example how a specific policy expression model can be combined with the suggested architecture in compliance with certain industrial standards.

BACKGROUND

Access Control is one of the major security mechanisms in any modern information system. Within industrial systems, such as industrial control systems, logistics, manufacturing, etc., cybersecurity is an attribute of growing concern. In the light of recent cyber-attacks, as well as the technical evolution towards increasingly connected and digital manufacturing systems, it is evident that many cybersecurity practices have to be revised. Access control is of growing importance also in the lower layers of the control system, as also these layers are adapted to a more services-based approach.

Among the emerging characteristics of industrial manufacturing systems, adaptive manufacturing, as described for, e.g., modular automation [1], [2], [3] is implying an ever-changing set of production equipment, combined in different ways and following different workflow schemes to fulfill rapidly shifting production needs. This characteristic renders traditional methods for describing and enforcing access control policies less useful, e.g., with regards to management effort and possibility to follow the least-privilege principle [4].

In a questionnaire study, partly presented in [5], cybersecurity experts active within Swedish industry were asked on techniques used, and perceived challenges related to access control. Several of the identified challenges are of direct relevance for the functionality of an enforcement architecture, e.g., the issue of finding the right balance between usability and security, and the challenge of distributing policy data to devices. The present disclosure aims to suggest mechanisms countering some of these perceived challenges.

In order to handle the dynamic characteristics of future manufacturing systems, the access control policies must provide both flexibility and dynamicity. Attribute Based Access Control (ABAC), is one policy model which may provide such increased flexibility [6], [7]. An equally important aspect is that the mechanisms used to enforce policies can support timely and up-to-date policy decisions. The two most important functions of an access control enforcement architecture is to: 1) Provide an access decision, and 2) Grant or deny access to a resource in accordance to the access decision.

The Open Process Communication Unified Automation (OPC UA) is a communication protocol increasingly utilized as an interoperable protocol in Operational Technology (OT) environments. The protocol is described in the IEC 62541 [8] standard series, and includes descriptions on how to reach a high level of communication security. The described guidelines related to authorization essentially limits the interoperable parts to Role Based Access Control (RBAC) [9], which may not be the best fit for dynamically changing systems [10].

Chandramouli et al. [11] describes how an enforcement architecture for attributes-based access control can be built using a service mesh for micro-services-based applications. The approach is based on a "side-car" container to be present on all cluster-nodes and working as the Policy Enforcement Point (PEP). The architecture supports full mediation because all access requests are routed through the "side-car" container. The approach is designed for cloud-native micro-services, executed on containerized platforms. Further, it is related to manufacturing systems, typically including applications run on special purpose devices, which do not allow for mediation in this way. The concept of separating policy enforcement to a separate process is however interesting and could be useful for multi-service devices also in manufacturing systems.

Martinelli et al. [10] presents an enforcement architecture for OPC-UA that allows the inclusion of mutable attributes, as described by the Usage Control (UCON) access control model, an extension of ABAC. This architecture does however not utilize any of the standard components for authorization described by the OPC-UA standard. For example, the PDP is entirely placed on an "Usage Control System", containing a number of components not described by the standard, the PEP is extended to have components both on the client and on the server, etc. This means that the solution is in no way interoperable with current OPC-UA standard, in contrast to the approach suggested herein, which in principle make use of available standardized methods.

Sudarsan et al. [12] provides a survey of available techniques for access control models, sub-granting models and authorization governance in the context of IoT and CPS, specifically from the context of non-constrained devices. The focus of is on the sub-granting models, i.e., how permissions are delegated. Here OAuth is discussed in length, providing references to several works describing strengths and weaknesses with authorization delegation using OAuth-tokens. Attribute Based Access Control (ABAC) as well as Next Generation Access Control (NGAC) is discussed, particularly pointing out the merit of NGAC compared to XACML with regards to complexity and time needed for rule-inference. The context is well-aligned with the use-cases discussed in this disclosure, as the interacting devices of a modular workflow-based manufacturing system typically are relatively powerful, as compared to e.g., simple IoT sensors, which may be part of the underlying module composition.

Dramé-Maigné et al. [13] provides a broad state of the art study on enforcement architectures for IoT systems, looking specifically on available solutions for tokens-based enforcement. They present four principal architectural concepts: centralized, hierarchical, federated and distributed, along with evaluations on several verticals. The approach follows, in principle, a hybrid centralized/distributed approach, with centralized policy decisions for dynamic permissions and role assignment, and local decisions for static role-permissions.

SUMMARY

An objective of the present disclosure is to propose an approach for constructing an access control enforcement architecture, which alleviates perceived challenges and is practically useful in industrial automation and control systems (IACS), notably for manufacturing environments. The enforcement architecture shall preferably support the features of dynamic and flexible manufacturing systems (and control system associated with these) and be possible to implement using available industrial standards. A further objective is to propose different strategies for using claim-based tokens as part of the enforcement mechanism, including how access control policies expressed using a standardized ABAC policy model can be formulated using access tokens.

At least some of these objectives are achieved by the invention as defined by the independent claims. The dependent claims relate to advantageous embodiments of the invention.

In a first aspect of the invention, there is provided a computer system with the technical features according to the disclosure.

The technical features enable dynamic policy privileges and static policy privileges to be handled differently. This distinction aims to separate such parts of the access-control policy which are changed or expected to be changed relatively more often (dynamic) from the remainder, which is relatively more stable. Performing all decision-making locally in the resource server reduces the necessary amount of communication within the computer system but could also bring the inconvenience of having to update, in the case of a change, all locally stored copies of the access-control policy. Much of the reduction is maintained, and the inconvenience is reduced, if the decision-making related to the dynamic policy privileges is referred to the centralized authorization server. Frequent updates of those parts of the access-control policy which affect dynamic policy privileges can be made with a limited effort since the centralized authorization server is common to the resource servers. The advantage will be even more pronounced if the second-type PDPs are associated with local policy-data repositories storing only a portion of the access-control policy which is independent of the dynamic policy privileges and which, therefore, need not be updated unless the static policy privileges are to be changed.

It is understood that the authorization server is distinct (independent) from some or all of the resource servers. Preferably, the authorization server and the resource server each comprise an input/output interface for communicating with other entities in the computer system, wherein the two input/output interfaces shall be distinct. This allows reconfiguration of variable explicit permissions/restrictions to be made frequently without significantly increasing the number of calls to the resource server's input/output interface.

In some embodiments, there is a single centralized authorization server, which is thus common to all resource servers in the computer system. In other embodiments, the resource servers are clustered into groups which each share an authorization server, through which the access-control policy can be conveniently updated with effect on the dynamic policy privileges decided therein.

In some embodiments, the dynamic policy privileges are decided on the basis of a at least one explicit permission/restriction of a user to a resource, wherein the explicit permission/restriction references said resource directly. Additionally, or alternatively, the static policy privileges are decided on the basis of at least one role which is associated with a user, wherein each role references the resources only indirectly via the access-control policy. A "role" in this sense may be understood functionally as an indication of a group membership which grants a set of privileges or permissions laid down in the access-control policy. A role need not be permanently associated with the user, rather the association may be reconfigured. In the interest of efficient administration of the policy privileges, however, the expected use is to let roles represent static or semistatic properties of a user and rely on explicit permissions/restrictions for minor and/or short-term modifications.

In further embodiments of the first aspect of the invention, the first-type PDP is configured to generate (e.g., on request by a user or user client) an access token which indicates at least one role associated with the user and at least one explicit permission/restriction to access at least one of the resources, wherein each permission/restriction references said at least one resource directly and each role references the resources only indirectly via the access-control policy. The content of the access token combines roles, which allow a bundle of static policy privileges to be expressed concisely, and explicit permissions/restrictions, which add specificity and ease of reconfiguration of dynamic privileges. Additionally, the size of the access tokens which the authorization server generates can be controlled, which limits the share of the internal communication capacity that is devoted to access-control transactions and/or helps observe a predefined size limitation on access tokens. The dichotomy between static and dynamic policy privileges may be defined not only on the basis of the factors discussed above (convenient central reconfiguration of dynamic privileges, local decision-making on static privileges) but also while taking into account the need to control the size of the access tokens. If the static category absorbs a greater share of the policy privileges, the average size of access tokens may be expected to decrease.

In still further embodiments, the first-type PDP is further configured to generate (e.g., on request by a user or user client) a single-operation access token indicating an access claim which allows a permission to access a resource to be exercised only once. The single-operation access token can be used for isolated resource requests. It can also be used to open a new session between the user client and the resource server, or to refresh a current session. This would allow any level of dynamicity to the policy evaluation for sporadic resource requests, rather than issuing a new access token complete enough to replace the one currently in force. Consider, for instance, the inconvenience of having to indicate—for all open sessions—all the potential actions an operator is allowed to do in relation to all process objects in a complex manufacturing environment in the substitute access token. Advantageously, the availability of single-operation access tokens allows policies even closer to the principle of least privilege being expressed and enforced in the computer system. The single-operation access token can also provide a useful shortcut for specifying policy privileges which are difficult or tedious to express in terms of roles and/or explicit permissions/restrictions from those.

A further use case envisioned for the single-operation access token is to implement dual approval, namely, where the access-control policy permits access only when the user obtains the supplementary approval of one or more further users. Dual approval may be applied as a safeguard against inadvertently using costly or hazardous resources in the computer system, e.g., causing machinery to halt during manufacturing, causing the draining of a large container with process liquid etc. In a dual approval setup, then, each of the sub-approvals may be expressed and transmitted in the form of a single-operation access token.

The computer system according to the first aspect may be included in a distributed control network, a safety network, a factory automation network, an industrial automation network (e.g., for supporting a dynamic manufacturing system), a mobile robot control system, or it may be utilized in similar industrial applications.

In a second aspect of the invention, there is provided an authorization server with the technical features according to the disclosure. The authorization server is configured to be included in a computer system where the decision-making on dynamic and static policy privileges is assigned to different entities. More precisely, the authorization server has a first-type PDP which decides on dynamic policy privileges in response to a request by a user client, but refers any decisions on static policy privileges to the second-type PDPs in the resources servers. The authorization server is common to all these resource servers and therefore enables convenient, centralized reconfiguration of the dynamic policy privileges, as explained above.

In a third aspect, there is provided a method in a user client, which comprises the steps defined in claim 10. The method includes the obtention of an access token, which indicates at least one role associated with the user and at least one explicit permission/restriction to access at least one of the resources, and the submission of this access token to the resources server when the user client is going to access the resources therein (resource request). The content of the access token combines roles, which allow a bundle of static policy privileges to be expressed concisely, and explicit permissions/restrictions, which add specificity and ease of reconfiguration of dynamic privileges. Further, the size of the access tokens which the authorization server generates can be controlled, which limits the share of the internal communication capacity that is devoted to access-control transactions and/or helps observe a predefined size limitation on access tokens.

In a fourth aspect, there is provided a method in an authorization server, with the steps according to claim 12, for generating an access token. As already explained, the content of the access token combines roles, which allow a bundle of static policy privileges to be expressed concisely, and explicit permissions/restrictions, which add specificity and ease of reconfiguration of dynamic privileges. This also enables efficient control of the size of the access tokens.

In embodiment where the processing in the authorization server excludes any decision-making on policy privileges based on the user's role or roles (e.g., permissions/restrictions related to the user's roles), this method is suitable for execution in a computer system where the decision-making on dynamic and static policy privileges is assigned to different entities. Indeed, decisions on policy privileges flowing from the user's roles can be referred to a second-type PDPs in a resource server in the computer system.

In a fifth aspect of the invention, there is provided a method in a resource server, with the steps according to the disclosure, in which an access token is processed and made the basis—at least in part—of granting access to resources in the resource server. The result of the policy decision can be described as the permissions related to the user's roles (as determined by evaluating the access-control policy) together with the explicit permissions indicated by the access token after deducting the explicit restrictions indicated by the access token. The content of the access token combines roles, which allow a bundle of static policy privileges to be expressed concisely, and explicit permissions/restrictions, which add specificity and ease of reconfiguration of dynamic privileges. Further, the size of the access tokens to be transmitted to the resource server generates can be limited.

In some embodiments of the fifth aspect, the decision-making on permissions/restrictions is performed when the user client makes a resource request. In other embodiments, the decision-making is performed in advance, such as upon receipt of the access token, in which case the result may be temporarily stored for later use.

Further aspects of the invention provide a user client configured to perform the method of the third aspect, an authorization server configured to perform the method of the fourth aspect, and a resource server configured to perform the method of the fifth aspect. The same technical effects and advantages may be expected with these further aspects as for the methods, and they may be implemented with a corresponding degree of variation.

The invention further relates to computer programs containing instructions for causing a computer, or the mentioned devices and system in particular, to carry out the above methods. The computer programs may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical, or solid-state type. Still within the scope of "data carrier", such memories may be fixedly mounted or portable.

In some embodiments, the access-control policy may for example specified in an attribute-based access-control (ABAC) language. There currently exist general-purpose AC languages that have the richness to express fine-grained conditions and conditions which depend on external data. One particular example of an ABAC language is the eXtensible Access Control Markup Language (XACML) which is the subject of standardization work in a Technical Committee of the Organization for the Advancement of Structured Information Standards (OASIS, www.oasis-open.org). A policy encoded with XACML defines access control permissions based on the attributes of the subject, of the resource, and of the action that the subject wants to perform on the resource (e.g., read, write). The policy consists of functional expressions in attribute values, and the return value (decision) of the policy is one of Permit, Deny, Not Applicable, or Indeterminate. In these embodiments, the role or roles of the user are expressed as a value of an attribute in the access control policy. A potential improvement of the basic ABAC concept, which could facilitate implementations of the present invention, is to add a functionality for querying the full set of permission on the relationship between a client (user client) and a resource.

In the terminology of the present disclosure, the term "user" shall be construed broadly. It may refer to a human user, a networked processor, a server, a machine, or part thereof, an executing software process, or any other entity that can be assigned access rights in accordance with an access-control policy. A "user" in this sense may be equivalent to a "subject" in NGAC and other standardized terminologies.

The term "user client" refers to hardware or software enabling a user to interact with the computer system generally and the resources in particular.

A "server", or host computer, is understood to be a device or computer sub-system that is able to provide specific facilities to other devices (clients) attached to the network. The server may be characterized as a network-connected processor or memory such that its capabilities are, at least partly and at least temporarily, at the disposal of the clients.

A "resource" may be, for example, a portion of a personal storage quota, a business unit storage quota, an information retrieval system, a (portion of a) database, an online service, a protected webpage, or a physical device. In the particular context of an industrial access control system, the resources may be input/output signals connected to the industrial process and application code controlling the process. The term "resource" may be interchangeable with "object". A resource server arranged below the resource with which the user client interacts (i.e., further from the user client) is also a "resource" in the sense of the claims. A layered topology of this type may be useful to implement the invention in a legacy system, wherein the outer resource servers need not be equipped with PEPs capable of executing explicit permissions/restrictions in an access token according to the invention if the inner resource server's PEP has this ability.

An "attribute" is a characteristic of an element which may be referenced in expressions, particularly predicates, conditions, and rules, within an ABAC policy.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Enforcement Architecture—Proposed Designs

In order for a set of policy rules to be effectively enforced in a system, the design of the enforcement architecture is crucial. In this section the basic elements of an access control enforcement architecture are introduced, together with four different architectural patterns useful for achieving an enforcement architecture supporting dynamic access control.

Elements of an Attribute Based Access Control Enforcement Architecture

Figure 1:
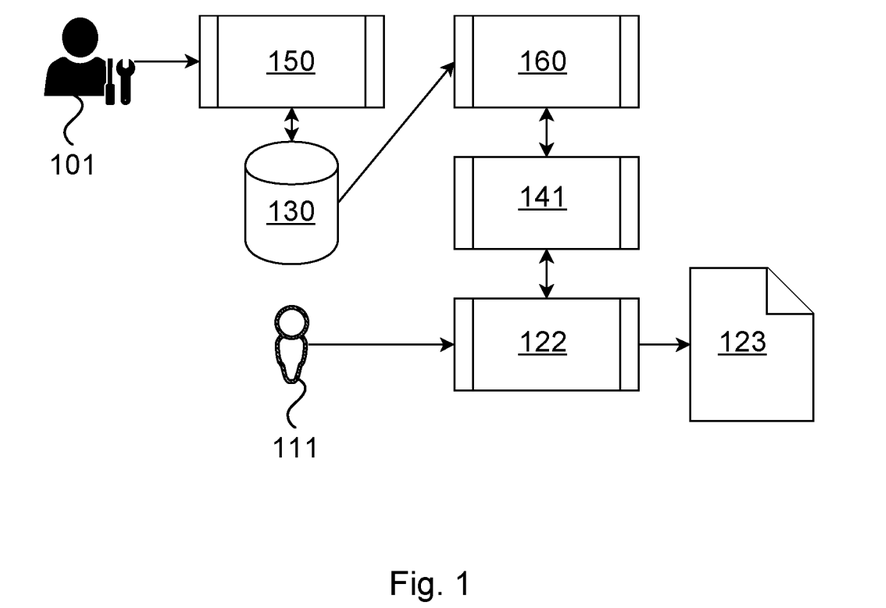
FIG. 1 shows elements of an authorization enforcement architecture.

The basic elements of an enforcement architecture are depicted in FIG. 1, based on the model for access control mechanism distribution provided by Hu et al. [14]. See also IETF RFC 2904 for the terminology. The architecture contains a Policy Administration Point (PAP) 150, providing administrative functionality, i.e., updating of Policy Data, as entered by an administrator 101 and stored in a Policy Repository 130; Policy Information Points (PIP) 160, which provide interfaces for querying policy data; Policy Decision Points (PDP) 141 which contain the logic for deciding if a resource request from a subject shall be granted or denied; Policy Enforcement Points (PEP) 122, which enforce the policy decision in respect of resources 123.

Full conformity with Hu's model is not essential for the present invention. It matters how the key steps are distributed among the entities identified as PAP, PIP etc., whereas optional or otherwise less important steps can be distributed as desired in a specific use case.

This architecture is particularly efficient if all resource requests are mediated by a PEP. Before allowing a subject to access the resource, the resource request must be evaluated against available policy data, which is done by the PDP, which reads policy data from PIPs.

Architectural Patterns for Dynamic Access Control

Using the elements as defined above, a number of architectural patterns are possible. In this disclosure, the focus is on the policy decision and enforcement, hence the PAP and PIP are omitted in the following, assuming that the PDP can access the policy data it needs, and that secure and effective administration of policy data is possible.

In the context of a dynamic manufacturing system, one class of Resource Server (RS) are the digital interaction points for the physical manufacturing modules, e.g., exposing signal values for supervision and methods for high-level control of a module. The clients are operators supervising the process, digital orchestrators executing high-lever control operations, data-historian services, sibling modules, etc. In other words, clients representing human users as well as purely digital entities are possible. For the interaction between client, PDP, PEP and RS, the following four architectural patterns are considered:

(a) The client (or user client) 210 provides credentials in some form, and all logic for inference of permissions resides in the RS 220, i.e., PDP 241 and PEP 222 reside in RS 220 together with the resources 223. The RS 220 is configured with this information by any suitable method, such as by reference to a policy 230. See FIG. 2a.

(b) The client 210 provides credentials to RS 220 in some form, and all logic for inference of permissions resides in an Authorization Server (AS) 240. This is to say, the RS 220 asks an external PDP 241 for each resource request. See FIG. 2b.

(c) When the client 210 makes the resource request, the request itself contains all the logic needed to infer permissions, encoded in a token issued by a trusted AS 240. The RS 220 does not need any additional configuration to infer permissions from the token. All PDP-logic resides in AS, and all PEP functionality in the RS 220. See FIG. 2C.

(d) The client's resource request contains information used for inference, but additional logic is required by RS 220 to infer permissions. The provided token may, e.g., contain a set of roles that the client possesses relative to the resource. The RS 220 knows how to infer permissions from the token data. The PDP split between AS and RS into two sub-PDPs 241', 241". These access policy data from respective repositories 230', 230". See FIG. 2d.

The user client 210, resource server 220 and authorization server 240 may form part of a computer system. In addition to the components explicitly drawn in FIG. 2, the user client 210, resource server 220 and authorization server 240 may each comprise memory, processing circuitry and an input/output interface. It is furthermore assumed that these entities include mutually synchronized clocks.

Reasoning for a Suggested Approach

Figure 2A:
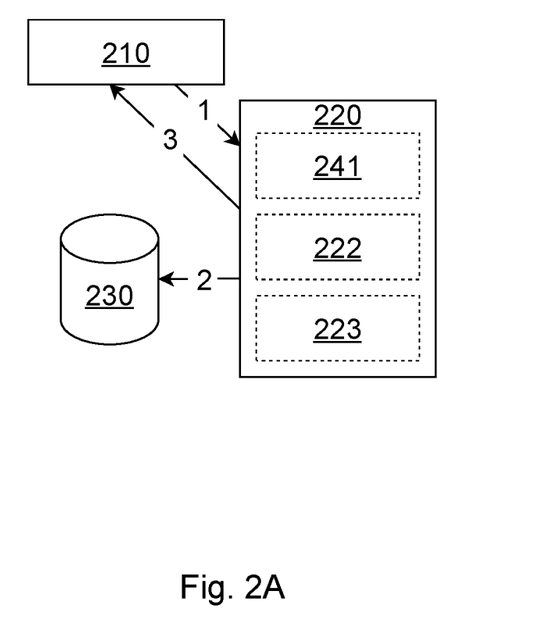
FIGS. 2a to 2d illustrate four authorization architectures.

In architecture (a) shown in FIG. 2A, the responsibility for how to infer resource permissions are loaded onto the resource server, which needs to have access to the policy data and know how to use that data. Even though the service end-points are not heavily resource-constrained with regards to computational power or memory availability, it is unfeasible to store the full set of possible users, and the full set of policy data required to infer permissions for a specific user. Furthermore, the policy data must be up-to date also with regards to the dynamic parts.

Figure 2B:
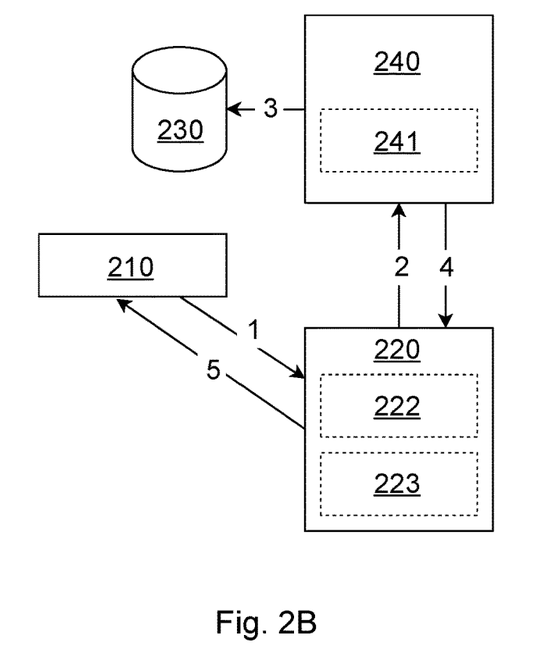

In architecture (b) shown in FIG. 2B, the RS is the active entity in relation to the PDP, and is responsible for initiating a communication channel for policy decisions. Thus, the pattern forces the RS to become an active client relative to an AS in order to protect its resources, which seems unfeasible. It may also result in long response times due to the chain of communication and scalability issues.

Figure 2C:
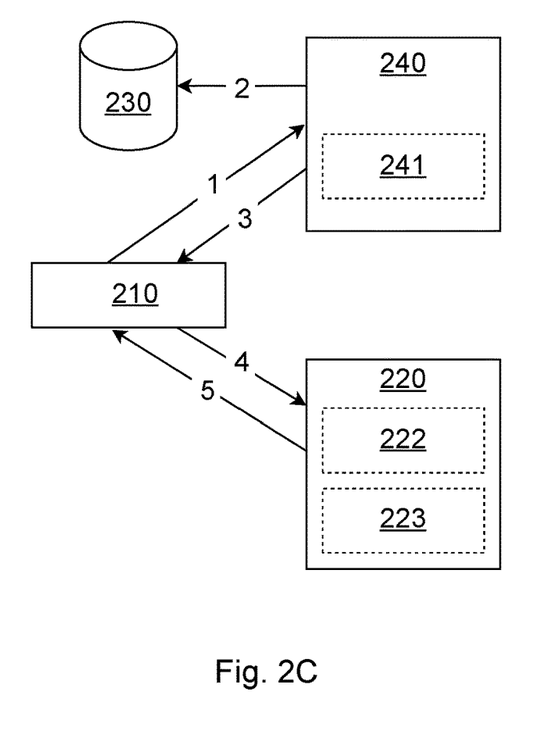

In architecture (c) shown in FIG. 2C, the client is responsible for attaching needed information for the RS to enforce policies. The method is using delegation through an AS, which issues a security token containing information and assurance of validity for a specific resource request. In this architecture, the access token must contain explicit permissions, since the resource server only contains a PEP. This requires the AS to have a very detailed knowledge of the RS operations, and may require the token used for passing information on permissions to contain huge amounts of information.

Figure 2D:
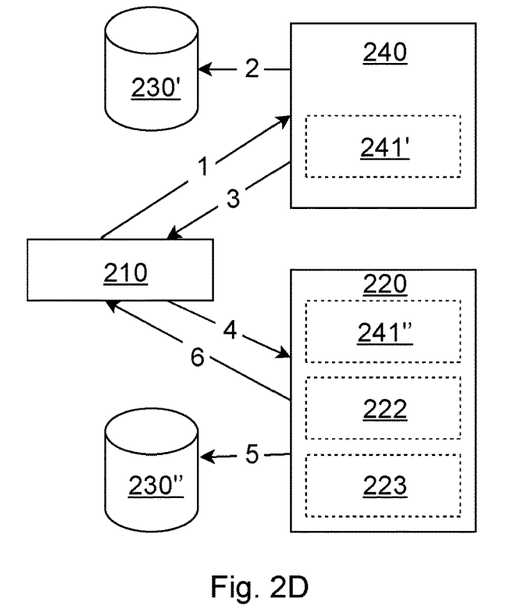

Architecture (d) shown in FIG. 2D allows for part of the PDP and policy data being available for the resource server and part being passed in an access token, as described for architecture (c). In this architecture, the PDP', placed in the AS, could decide on dynamic policy privileges, and the PDP", in the RS, decide on static policy privileges, to allow a separation between dynamic and static permissions.

The following premises emerge from the reasoning:

Centralized dynamicity: For the policy decision point to make a correct decision, it needs access to policies and policy-related data. For dynamic policy-data, it is unfeasible to require all RS to hold or fetch an up-to date copy of this dynamic information. The dynamic part of the policy decision should therefore be centralized.

Localized enforcement: The enforcement of a policy decision must be kept close to the requested resource to be effective.

One active client: The client is the active party in an access-token request. It shall also be the active entity in relation to other entities in system, if possible (using a secure method).

Looking back at the presented architecture-patterns, using these premises the following can be concluded: Architecture (a) allows for localized enforcement and active client, but contradicts the premise on centralized dynamicity. Architecture (b) allows for localized enforcement and centralized dynamicity, but contradicts the premises of the active client. Architecture (c) follows the expressed premises, but may be unfeasible in complex scenarios. Architecture (d) follows all expressed premises, while possibly keeping the amount of information contained in the access token to a manageable amount.

The reasoning indicates that architectures (c) and (d) can fulfill the premises. Both of these alternatives use access tokens for communicating privileges, and are further explored in the following section.

As already mentioned, in a variation of architecture (d), an outer resource server may be deployed as resource of an inner resource server. It is understood that the user client interacts with the inner resource server (aggregate resource server) and can gain access to the outer resource server only if the inner resource server permits it to. The inner resource server need not have any resources of its own, just act as an intermediary. A layered topology of this type may be useful to implement the invention in a legacy system, whereby the outer resource servers need not be equipped with PEPs capable of executing explicit permissions/restrictions in an access token according to the invention if the inner resource server's PEP has this ability.

Assuming the outer resource server is not able to execute the explicit permissions/restrictions in the access token, then the inner resource server can be configured to apply these explicit permissions/restrictions to selectively forward any resource requests that would be granted according to the explicit permissions/restrictions and to stop any resource requests that would be declined according to the explicit permissions/restrictions. The assumed inability of outer resource server to execute the explicit permissions/restrictions may for example be due to the use of novel syntax elements that its PEP cannot process or to other incompatibilities. Providing the (aggregate) resource server between the user client and the outer resource server may be a more convenient option than upgrading all local PEPs in an existing computer system 200.

Using Access Tokens for Dynamic Access Control

In this section different ways of expressing claims in access tokens will be explored. One major issue using access tokens is to know what information shall reside in the token, and what logic is needed to infer permissions from that information. Access tokens are typically used for activating a session between a client and server, and must therefore contain information valid for policy enforcement for the entire session.

One typical way of expressing privileges in access tokens is by using role claims, e.g., the OPC UA standard describes a list of well-known roles that AS and RS are expected to use. This is a logical approach for scenarios where the set of privileges are static, but to allow for dynamic scenarios, e.g., based on workflows, what is communicated in the token has to be more specific.

Explicit Permissions

One option is providing claims that are explicit permissions, i.e., the RS does not need to perform additional logic to decide what the client is allowed to do, correlating with architecture (c). The AS must have a detailed knowledge on the resources protected by the resource-server, and express the current permissions for the specific client. As mentioned, this could lead to an increasing size of access tokens, especially for complex resource servers.

Dynamic Role Configuration

Another alternative is to allow dynamic behavior by dynamically configuring the RS, so that it can infer fine-grained permissions based on local policy data. The token can in this case still contain simple data on static roles, but the resource server can provide dynamically shifting resource permissions, in line with a variant of architecture pattern (d). The approach is to some extent in conflict with the premise on centralized dynamicity, and would not be feasible in systems where the permissions shift frequently, but it may be a good alternative for systems which most of the time are static with regards to active permissions.

Static Roles and Explicit Permissions

A third alternative is to combine roles and explicit permissions, using static roles known by the resource server for permissions that do not change while explicit permissions can be used for privileges that change over time. This would also be variant of architecture (d).

There are sets of permissions that quite easily can be tied to a role, and which are possibly not changed significantly over time. One such example is the role observer, to grant read-access permissions to most data. Using static roles together with explicit permissions, e.g., related to permissions required for currently active workflows, would give a more balanced set of claims to be expressed in the access token, as compared to using only explicit permissions.

Single Operation Tokens

Another variant of architecture (d) is to use roles for static permissions, and single operation tokens for the permissions that change over time. The single-operation token will be specifically requested by the client, including identification of the operation, for permissions not covered by the static roles. The AS will evaluate the access-token request and, if granted, issue a token containing a claim which can be used to exercise the permission only once. The token is used to open a new session, or to refresh the current session. This scheme would allow any level of dynamicity to the policy evaluation for sporadic resource requests, as any such interaction would require a new token being issued. The single-operation token is currently not part of the JWT standard [15].

Single-operation tokens are a specialization of the third alternative above, which would allow policies even closer to the principle of least privilege being expressed and enforced in the system. For some types of interactions, the single-operation token is a more practical concept—consider, e.g., all the potential actions an operator is allowed to do in relation to all process objects in a complex manufacturing environment, it would be wasteful to have all of them pre-calculated and put into access tokens for all open sessions. Instead permissions could be evaluated and granted just-in-time and on demand.

Implementation

The previous sections provides suggestions on enforcement architectures for flexible access control, and details ways of using access tokens to realize the architectures. This section describes how to implement such enforcement architectures. Using policies expressed in Next Generation Access Control (NGAC) communicated as claims in JSON Web Tokens (JWT) is the approach followed in this disclosure, which draws on available standardized mechanisms, also supported by the OPC UA standard.

Among the suggested approaches, the most balanced and flexible solution is to follow architecture pattern (d), with static roles for privileges that are constant over time, and with explicit permissions for privileges that change over time. An implementation of an enforcement architecture following this approach is outlined as well. The goal of this implementation is mainly to show the feasibility of the suggested approach.

The implementation is done in .NET Core, C #, using the OPC Foundation .NET OPC UA stack for the communication interactions, the Microsoft.IdentityModel functionality for JWT creation, and the PolicyMachine (https://github-.com/PMMaster/policy-machine-core) for NGAC policy model representation.

Use Case

Figure 3:
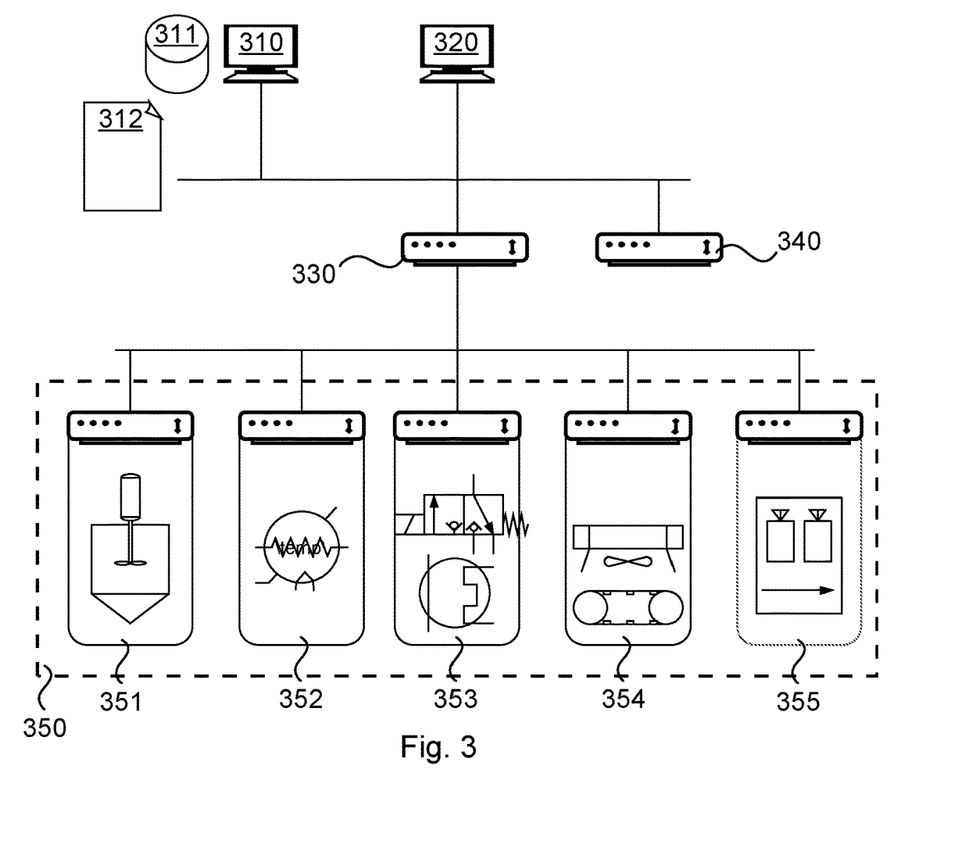
FIG. 3 is an architecture overview relating to an example use case (ice-cream factory)

Consider an ice-cream production process, designed according to the modular automation system design strategy, illustrated in FIG. 3. This specific realization of the production process comprises five separate modules (collectively references by 350) for mixing 351, pasteurization 352, homogenization 353, dynamic freezing and flavoring 354, as well as packaging and static freezing 355. Orchestration of different production recipes 312 is done by an orchestrator unit 330. Recipe configuration and orchestration follow the approach described in [16]. FIG. 3 further shows an engineering interface 310, engineering repository 311, an operations interface 320 as well as an authorization service 340. All units are communicatively by a data network.

Figure 4:
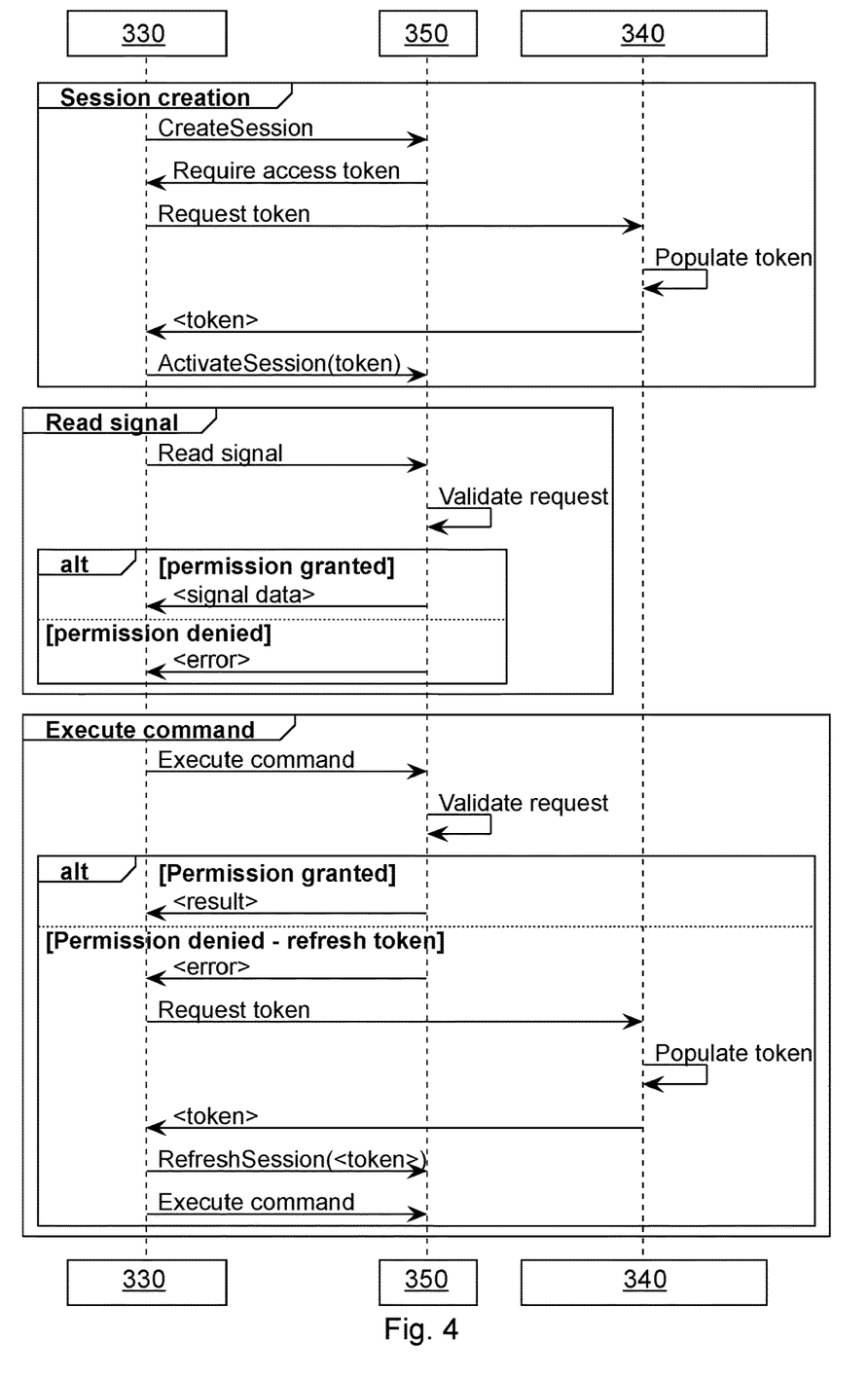
FIG. 4 contains sequence diagrams showing information exchanges among the entities depicted in FIG. 3 when initializing a session, reading a signal, and executing a command.

FIG. 4 is a sequence diagram showing communications exchanged between the orchestrator 330, a concerned one of the modules 350 and the authorization service 340 in three example flows: Session creation, Read signal and Execute command. The second and third flows end with one of two alternative subflows, depending on whether permission was granted.

Combining JWT with NGAC

NGAC [17], [18], is a policy expression model standardized by the American National Institute of Standards and Technologies (NIST). In NGAC, the policies are described using graph representations, where the permissions are evaluated traversing the graph, which can be done with low computing complexity. NGAC provides the ability to calculate the full set of permissions that a subject holds relative to an object.

JSON Web Tokens (JWT) is a container for claims encoded in a JSON Web Signature (JWS) [19] or JSON Web Encryption (JWE) [20] structure, i.e., with signed and/or encrypted payload. It is a standardized messaging format for providing claims from an AS to a resource. Using JWT for authorization is part of the OAuth2 framework [21], with use and claims described in [15]. A claim C is defined as C=(n, v), with the first component n being a name, the second component v being a value. The value may be a scalar, an array, or a more complex data type.

Below is a simple example of a claims-section of a JWT:

```
{
"sub": "client_id", "aud": "resource_id",
"name": "readable client name" "iat": 1516239022,
"exp": 1516241022,
"roles": ["observer", "operator"], "entitlements": ["method1", "method2"],
...
}
```

The audience (aud) field uniquely identifies the resource, the subject (sub) field identifies the client, the iat field is the time of issuing and exp is the expiry time. The roles array lists the roles that the client has, while entitlements list additional method permissions for the client.

With these provided classes of claims, a JWT can effectively express roles, or role-like static groups of permissions, as well as more specific entitlements. Provided this information can be extracted from the NGAC graph database, a transformation from a list of granted operations into a set of JWT claims is possible.

If using the approach in accordance with architecture (c), with the AS granting explicit permissions, the permissions can be inferred directly from the NGAC graph and put into the token. The NGAC graph will need to contain all possible read, write, and execute operations related to a RS. This approach would remove the need for the roles claim, placing permissions directly in the entitlements claim, e.g., "entitlements": ["valve.read", "lvl.read", "openValve.execute", . . . ]

If using the alternative of static roles, with the dynamic logic in the RS, the token layout and NGAC graph content can be very simple, e.g., a flat combination of roles and subjects. The entitlements claim will not be needed. In the NGAC graph, the associations between client and resource attributes could be names of roles instead of operations, as the actual permissions are not known by the AS. However, management of reconfiguration of the RS when the permissions related to static roles are changed, is needed. This is not covered by the enforcement architecture.

Combining static roles and explicit permissions allows for access tokens of reasonable size and complexity, balancing the amount of configuration and logic needed in the RS. In this case, both the entitlements and roles claims are used. To allow this, the explicit permissions and static roles must be possible to infer from the NGAC graph. However, in NGAC all permissions are described in the same way. One very simple alternative is to have separate NGAC graphs for static roles and explicit permissions respectively. There are of course ways of allowing explicit permissions and roles being present in the same graph, e.g., by naming conventions or by using attributes.

If using single-operation tokens, the client could open a separate session for those operations, which will implicitly require the issuing of a new token. The design of the NGAC graph does not need to change from the previous example, but the flow for requesting and using the access token needs to be adapted, so that the client can issue different types of access-token requests to the AS, differentiating single-operation access-token requests from ordinary access-token requests.

Implementation Details

In this section, the implementation details related to enforcement architecture pattern (d), using a combination of static roles and explicit permissions, is described.

The focus of the implementation is on the elements and mechanisms of the enforcement architecture. Details on high-level control, recipe execution, real-time characteristics, etc. are left out. Furthermore, it is assumed that identification and authentication of the different entities are done in a secure way, according to the available methods prescribed in the OPC UA standard. We describe the implementation for the interactions between an orchestrator (as client) and a module server (as RS), the described architecture and mechanisms are however useful throughout the system.

The method of creating policies from active recipes are using the algorithm presented by Leander et al. [4], which will keep privileges in an NGAC-graph updated to only allow execution of active recipes. One extension of the algorithm is that the read-operations for supervisory data is collected under a common observer role, which the orchestrator will be assigned to. The modules are assumed to know the local permissions to grant for this specific role. However, for the high-level commands, explicit permissions are required.

All the interactions between entities in the system use OPC UA client/server communication. Issuing of access tokens follows the indirect authorization flow, as defined in the OPC UA standard 2. Some example sequences of interactions between the orchestrator, a module and the AS is illustrated in the sequence diagram in FIG. 4.

Two of these interactions must be further elaborated, since the logic is not described by available standards, namely how the token is populated by the AS, and what steps are taken by the Module to validate the token. These two interactions detail the policy decision and enforcement respectively.

1) Populate Token: For the orchestrator to be able to activate a session, it needs an access token, issued by an AS trusted by the module. The orchestrator uses its credentials in a call to the AS, including information on the identity of the module. The AS must create an access token, populate it with valid privileges, sign it and return it to the orchestrator.

In this implementation, the AS queries an NGAC graph database requesting all the privileges that the orchestrator holds on the specific module. Privileges marked as roles will be added to the list of roles claims. Any additional explicit permissions are added to the list of entitlements claims. A specific access token issued for the orchestrator, for privileges on the Pasteurizer module during recipe execution, may contain claims according to the following:

```
{
"sub": "Orchestrator_id",
"aud": "Pasteurizer_id", "roles": ["observer"],
"entitlements": ["StartPasteurize", "EmptyTank", "FillTank"]
}
```

In this way, the privileges expressed by the NGAC database are expressed in the access token that is used to activate or refresh the orchestrator session to a specific module. The token contains all the information needed for the module to act as a policy enforcement point.

2) Validate Request: When the orchestrator requests a resource from a module, either in the form of a data read or command execution, the module must validate the request against the permissions granted by the access token associated with the current session.

The basic validation of the token is done at session activation, e.g., that the signature is valid, that the issuer is the expected one, and that is equal to the id of the module, and that the token has not expired. The permissions granted by the roles-claim may also be evaluated already at this stage.

However, in this implementation the correlation between resource request and permission is validated upon the time of the resource request. The validation is done in the following steps:

Expiry time of token is checked—if expired, access is denied.

Resource request is compared with the list of explicit permissions, as part of entitlements claim. If the requested resource matches an explicit permission, access is granted.

Otherwise, for each role in the roles claim, the resource request is compared with the static permissions granted by that role. If the requested resource matches the role-permission, access is granted.

Otherwise, access is denied.

Methods

Figure 5:
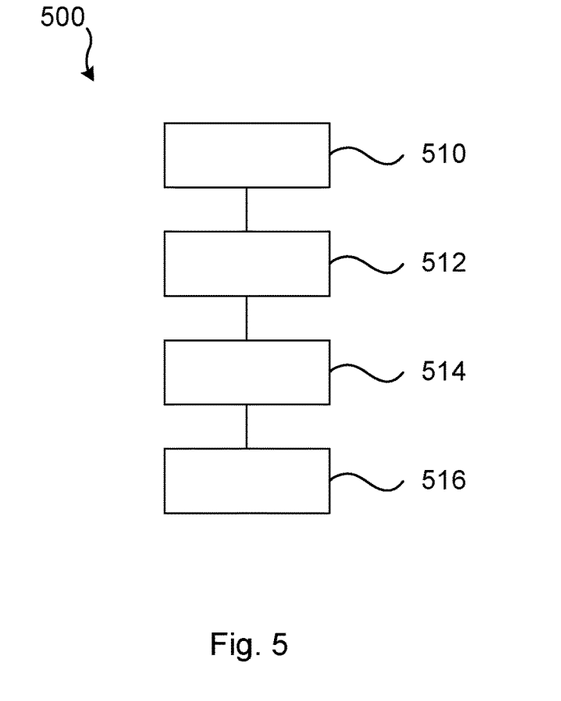
FIGS. 5 to 7 are flowcharts of different aspects of a process in which a user interface requests and gains access to resources in a resource server with the assistance of an authorization server, wherein FIG. 5 relates to a method in the user client, FIG. 6 relates to a method in the authorization server, and FIG. 7 relates to a method in the resource server.

FIG. 5 is a flowchart of a method 500, which can for example be executed in a user client 210 associated with a human or non-human user.

In a first step 510, an access-token request is submitted to an authorization server 240, wherein the access-token identifies a user of the user client and relates to said resources. It is understood that data-exchange operations such as 'submitting', 'receiving' shall be construed broadly in the present disclosure, to include sender-initiated data transfer over a local or wide-area communication network, data transfer over an internal data bus, uploading to or downloading from a shared memory, a recipient's polling the sender for the data, non-synchronous data exchange using publication/subscription methods, and the like.

In a second step 512, an access token is received from the authorization server 240 in response to the access request, the access token indicates at least one role associated with the user and at least one explicit permission/restriction to access at least one of the resources, wherein each permission/restriction references said at least one resource directly and each role references the resources only indirectly via the access-control policy.

In a third step 514, the received access token is submitted to the resource server.

In a fourth step 516, a resource request is submitted to the resource server 220 for accessing the resources 223.

The access-token request 510 and the resource request 516 can be submitted at independent points in time. For example, the user client 210 may initiate the execution for the method 500 to prepare the setting-up of a new session (e.g., a lasting session, with nonzero duration) with a resource server 220. Since there is no compelling need to synchronize the access-token request 510 and the resource request 516, the obtained access token may be temporarily stored until the new session is going to be requested. Similarly, if the user client 210 is going to use the access token for a number of isolated resource requests rather than a lasting session, the access token may be temporarily stored between these resource requests. For this purpose, the access token may be temporarily stored in a memory in the resource server 220, after the resource server 220 has received the access token the first time, or a memory in the user client 210.

Figure 6:
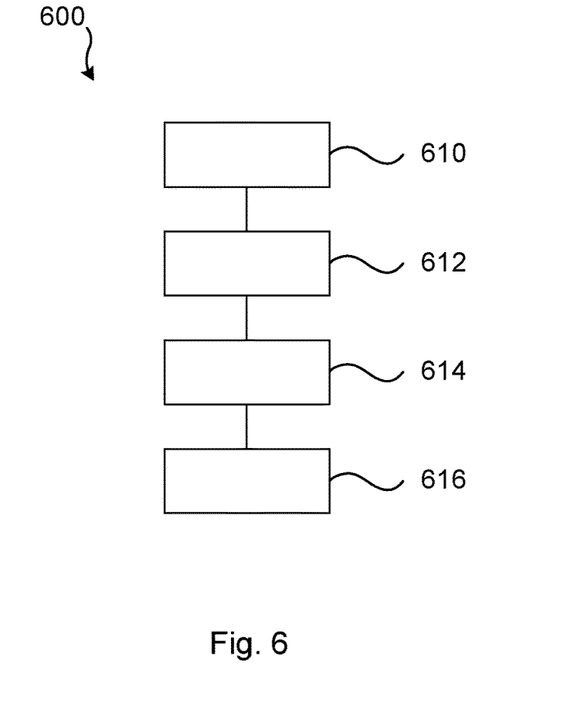

FIG. 6 illustrates a method 600, which may be executed in an authorization server 240.

In a first step 610 of the method 600, an access-token request is received from a user client 210, wherein the access-token request identifies a user of the user client and relates to said resources.

In a second step 612, at least one role associated with the user is determined. The role may be determined by querying a Policy Information Point 160. The second step 612 may further include a substep of authentication, i.e., determining the user's identity with a required certainty, and possibly with reference to credentials provided in the access-token request. The roles are not made the basis of decision-making in the context of the present method 600 but will be provided, within the access token, for later use by the second-type PDP 241" in the resource server 220.

In a third step 614, on the basis of the access-control policy, the authorization server 240 decides on dynamic policy privileges of the user, to obtain at least one explicit permission/restriction. The obtained permission/restriction is explicit in the sense that it directly references (e.g., uniquely identifies) the resource 223 to which it relates.

In a third step 616 of the method 600, an access token is provided. The access token indicates said at least one determined role of the user and said at least one explicit permission/restriction to access at least one of the resources, wherein each permission/restriction references said at least one resource directly and each role references the resources only indirectly via the access-control policy.

Figure 7:
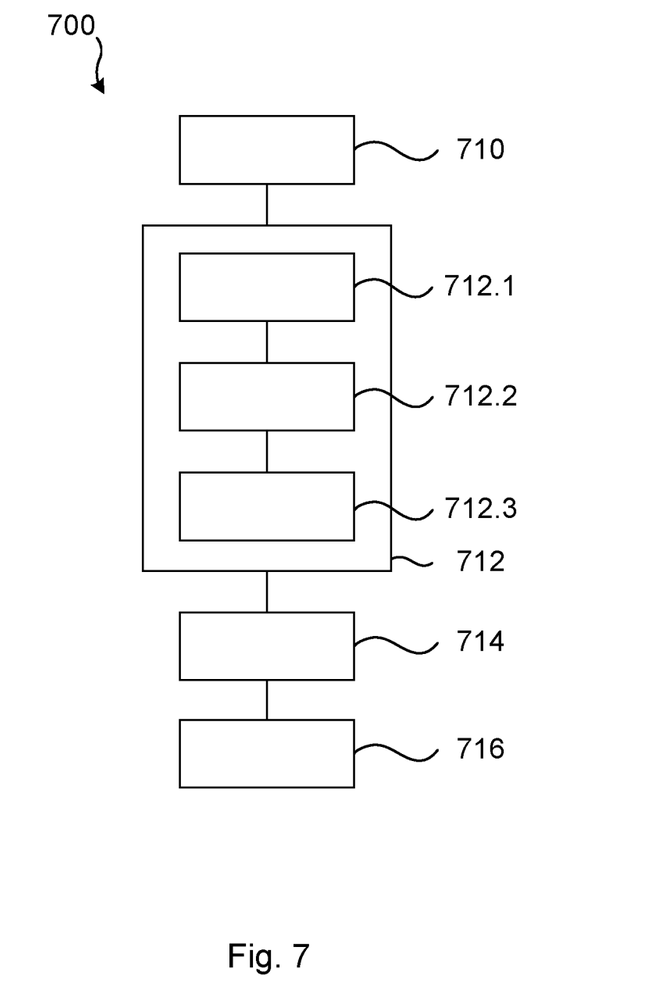

FIG. 7 is a flowchart of a method 700, which may be executed in a resource server 220.

In a first step 710, an access token is received from a user client 210. It is understood that the access token indicates at least one role associated with the user of the user client 210 and at least one explicit permission/restriction to access at least one of the resources 223 in a resource server 220, wherein each permission/restriction references said at least one resource directly and each role references the resources only indirectly via the access-control policy.

In a second step 712, a policy decision is provided by evaluating the access token against the access-control policy. This includes a substep 712.1 of deciding, on the basis of the access-control policy, on permissions/restrictions to access the resources following from said at least one role of the user. It includes the further substep 712.2 of adding these permissions/restrictions to said at least one explicit permission/restriction received in the access token.

It is optional to store, in a further substep 712.3, the outcome of the decision 712.1 temporarily until the permission/restrictions are to be relied upon. Such temporary storing may be useful, for example, if the second step 712 is performed in advance, e.g. without delay after the access token has been received 710, to reduce the response time when the user client 210 submits a resource request.

In a next step 714, the resource server 220 receives a resource request for the user client to access to at least one of the resources.

In a fourth step 716 of the method 600, the policy decision provided in the second step 712 is enforced, so that the user client is selectively granted access to all, some, or none of the resources it requested.

Discussion

Interoperability of Suggested Approach

The architectures, workflows and token content suggested in the present disclosure are all within the scope of available standardization, both with regards to OPC UA and JWT. However, the standards are quite flexible w.r.t, what is possible. This means that e.g., using the concept with a single operation token can be done using described routines for session activation with JWT as user identity token, but the client, the RS and the AS must be aware of that scheme. In general, the logic for inferring permissions from an issued token is not described in detail in the OPC UA standard, and is therefore something that the client and server must agree upon using some other kind of contract.

However, the suggested solution provides interoperability so that a RS can be configured to require the client to request an access token from an AS which will issue the type of tokens that the RS can validate, the client can use the tokens issued. As long as the authorization service issues valid tokens, there is no risk of privilege escalation attacks occurring, regardless of the client application being used.

Policy Components of the Client

In the described architectural patterns, no functionality related to policy enforcement and decision is placed on the client side. From a security perspective, this decision is quite easy to understand. The resources should not need to be protected by logic placed in the client—in case of a malicious client, those checks will be easily bypassed. However, from a usability point of view, the client is often relying on knowledge on active permissions to hide/disable parts of the user interface which is related to disallowed functionality.

The OPC UA information model contains information on active permissions for an open session, which is information that could be used by an HMI to adapt also to dynamically changing policies. What will not be as easy to support are permissions granted by single-operation tokens—as those are not evaluated until the client tries to execute the operation.

Tentative Conclusions

In this disclosure an approach for an access control enforcement architecture practically useful in manufacturing environments together with OPC UA has been disclosed. The suggested approach uses client-mediated access-tokens issued by an authorization server, and alleviates several of the perceived challenges identified by practitioners in the questionnaire study.

The suggested architecture pattern supports the features of evolving manufacturing systems, e.g., based on the modular automation design strategy, i.e., with a dynamic set of subjects, resources, and workflows. Strategies on how to combine the enforcement architecture with claim formulations are provided, including a description on using single-operation tokens, which is an extension of the current JWT standard.

To demonstrate its feasibility, an implementation of the approach is conducted and described, providing details on how the authorization server could populate access tokens using the NGAC policy expression model, and on how a client could validate resource requests using the available claims, covering policy decision and enforcement mechanisms.

Although the implemented solution is simple, it contains the principal components of a manufacturing system, and uses available standardized solutions.

Even though the suggested approach and outlined implementation follows the OPC UA standard, it does not mean that any third-party OPC UA server will be able to use the privileges as described in the present disclosure. In general, the logic for turning privileges into permissions is implementation-specific. As mentioned, the mechanism currently described in the OPC UA standard describes role-based access control. Explicit permission claims, expressed as entitlements, are supported by the JWT standard, but not in the OPC UA standard.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

LIST OF REFERENCES

1. ZVEI—German Electrical and Electronic Manufacturers' Association, "Process INDUSTRIE 4.0: the age of modular production," White Paper, Frankfurt, 2019.
2. J. Ladiges, A. Fay, T. Holm, U. Hempen, L. Urbas, M. Obst, and T. Albers, "Integration of modular process units into process control systems," IEEE Transactions on Industry Applications, vol. 54, pp. 1870-1880 March 2018.
3. T. Seifert, S. Sievers, C. Bramsiepe, and G. Schembecker, "Small scale, modular and continuous: A new approach in plant design," Chemical Engineering and Processing: Process Intensification, vol. 52, pp. 140-150, 2012.
4. B. Leander, A. Causevic, H. Hansson, and T. Lindstrom, "Toward an ideal access control strategy for industry 4.0 manufacturing systems," IEEE Access, vol. 9, pp. 114037-114050, 2021.
5. B. Leander, A. Causevic, T. Lindstrom, and H. Hansson, "A questionnaire study on the use of access control in industrial systems," in 2021 26th IEEE International Conference on Emerging Technologies and Factory Automation (ETFA), 2021.
6. B. Leander, A. Causevic, H. Hansson, and T. Lindström, "Access control for smart manufacturing systems," in Software Architecture, pp. 463-476, Springer Intl. Publishing, 2020.
7. V. Watson, J. Sassmannshausen, and K. Waedt, "Secure granular interoperability with OPC UA," in INFORMATIK 2019:50 Jahre Gesellschaft für Informatik—Informatik für Gesellschaft (Workshop-Beiträge), (Bonn), pp. 309-320, Gesellschaft für Informatik e.V., 2019.
8. "IEC 62541 OPC unified architecture, rev 1.05," standard, Internation Electrotechnical Commission, Geneva, CH.
9. R. S. Sandhu, E. J. Coyne, H. L. Feinstein, and C. E. Youman, "Computer role-based access control models," Computer, vol. 29, no. 2, pp. 38-47, 1996.
10. F. Martinelli, O. Osliak, P. Mori, and A. Saracino, "Improving security in industry 4.0 by extending OPC-UA with usage control," in 15th Intl. Conference on Availability, Reliability and Security, A C M, 2020.
11. R. Chandramouli, Z. Butcher, and A. Chetal, "Attribute-based Access Control for Microservices-based Applications Using a Service Mesh," tech. rep., National Institute of Standards and Technology, Gaithersburg, MD, August 2021.
12. S. V. Sudarsan, O. Schelen, and U. Bodin, "Survey on Delegated and Self-Contained Authorization Techniques in CPS and IoT," IEEE Access, vol. 9, pp. 98169-98184, 2021.
13. S. Drame-Maigné, M. Laurent, L. Castillo, and H. Ganem, "Centralized, Distributed, and Everything in between: Reviewing Access Control Solutions for the IoT," ACM Computing Surveys, vol. 54, no. 7, 2021.
14. V. C. Hu, D. Ferraiolo, R. Kuhn, A. Schnitzer, K. Sandlin, R. Miller, and K. Scarfone, "Guide to Attribute Based Access Control (ABAC) Definition and Considerations," technical report., NIST, 2014.
15. M. Jones, J. Bradley, and N. Sakimura, "JSON Web Token (JWT)." RFC 7519 May 2015.
16. B. Leander, A. Causevic, and H. Hansson, "A recipe-based algorithm for access control in modular automation systems," technical report, September 2020.
17. D. Ferraiolo, S. Gavrila, and W. Janse, "Policy Machine: Features, Architecture and Specification," white paper, NIST, October 2015.
18. D. Ferraiolo, R. Chandramouli, R. Kuhn, and V. Hu, "Extensible Access Control Markup Language (XACML) and Next Generation Access Control (NGAC)," pp. 13-24, 2016.
19. M. Jones, J. Bradley, and N. Sakimura, "JSON Web Signature (JWS)." RFC 7515 May 2015.
20. M. Jones and J. Hildebrand, "JSON Web Encryption (JWE)." RFC 7516 May 2015.
21. D. Hardt, "The OAuth 2.0 Authorization Framework." RFC 6749 October 2012.

The invention claimed is:

1. A computer system comprising:
one or more resource servers with resources to which access is controlled in accordance with an access-control policy specified in a computer-readable access-control language; and
a centralized authorization server, which is common to the one or more resource servers:
the computer system further comprising:

a first-type policy decision point, PDP, implemented by the centralized authorization server and configured to decide on dynamic policy privileges in accordance with the access-control policy; and one or more second-type PDPs implemented by respective ones of the one or more resource servers and configured to decide on static policy privileges in accordance with the access-control policy.

2. The computer system of claim 1, wherein the dynamic policy privileges are decided on the basis of at least one explicit permission/restriction of a user.

3. The computer system of claim 1, wherein the static policy privileges are decided on the basis of at least one role which is associated with a user.

4. The computer system of claim 1, wherein the first-type PDP is configured to generate an access token which indicates at least one role associated with a user and at least one explicit permission/restriction to access at least one of the resources, wherein each permission/restriction references said at least one resource directly and each role references the resources only indirectly via the access-control policy.

5. The computer system of claim 4, wherein the first-type PDP is configured to generate the access token in response to an access-token request from a user client, said access-token request identifying a user associated with the user client.

6. The computer system of claim 1, wherein the first-type PDP is further configured to generate a single-operation access token indicating an access claim which allows a permission to access a resource to be exercised only once.

7. The computer system of claim 6, wherein the first-type PDP is configured to generate the single-operation access token in response to a specific request from a user client, said specific request identifying a user associated with the user client as well as said resource.

8. The computer system of claim 1, wherein each second-type PDPs is associated with a local policy-data repository storing a portion of the access-control policy which is independent of the dynamic policy privileges.

9. An authorization server for use in a computer system, which comprises one or more resource servers with resources to which access is controlled in accordance with an access-control policy specified in a computer-readable access-control language,
the authorization server implements a first-type policy decision point, PDP, configured to:
decide on dynamic policy privileges in accordance with the access-control policy, and
refer, to a second-type PDP implemented by one of the resource servers, decision-making on static policy privileges in accordance with the access-control policy.

10. A method of accessing resources in a resource server of a computer system, wherein access to the resources is controlled in accordance with an access-control policy specified in a computer-readable access-control language,
wherein the method is implemented in a user client and comprises:
submitting an access-token request to an authorization server, said access-token request identifies a user of the user client and relates to said resources;
receiving an access token from the authorization server;
submitting the received access token to the resource server; and
submitting a resource request to the resource server for accessing the resources, wherein the access token indicates at least one role associated with the user and at least one explicit permission/restriction to access at least a first one of the resources, wherein each explicit permission/restriction references said first one of the resources directly and each role references at least a second one of the resources only indirectly via the access-control policy.

11. The method of claim 10, wherein the access token is submitted together with the resource request.

12. A method of generating an access token for enabling access to resources in a resource server of a computer system, wherein access to the resources is controlled in accordance with an access-control policy specified in a computer-readable access-control language,
wherein the method is implemented in an authorization server and comprises:
receiving an access-token request from a user client, wherein the access-token request identifies a user of the user client and relates to said resources;
determining at least one role which is associated with the user;
deciding, on the basis of the access-control policy, at least on dynamic policy privileges of the user, to obtain at least one explicit permission/restriction; and
providing an access token,
wherein the access token indicates said at least one determined role of the user and said at least one explicit permission/restriction to access at least a first one of the resources, wherein each explicit permission/restriction references said first one of the resources directly and each role references at least a second one of the resources only indirectly via the access-control policy.

13. The method of claim 12, wherein the user's roles are excluded from the deciding on the basis of the access-control policy.

14. A method of processing an access token, the access token relating to resources in a resource server of a computer system, wherein access to the resources is controlled in accordance with an access-control policy specified in a computer-readable access-control language,
wherein the method is implemented in the resource server and comprises:
receiving an access token from a user client;
providing a policy decision by evaluating the access token against the access-control policy;
receiving a resource request for the user client to access to at least one of the resources; and
enforcing the policy decision,
wherein the access token indicates at least one role associated with the user and at least one explicit permission/restriction to access at least a first one of the resources, wherein each explicit permission/restriction references said first one of the resources directly and each role references at least a second one of the resources only indirectly via the access-control policy,
wherein the policy decision is provided by
deciding, on the basis of the access-control policy, on permissions/restrictions to access the resources following from said at least one role of the user, and
adding these permissions/restrictions to said at least one explicit permission/restriction received in the access token.

15. The method of claim 14, wherein said deciding on permissions/restrictions is performed upon receipt of the access token and the outcome is temporarily stored.

16. The method of claim 14, wherein said deciding on permissions/restrictions is performed upon receipt of the resource request.

17. A device comprising memory, an input/output interface, and processing circuitry configured to perform a method of accessing resources in a resource server of a computer system, wherein access to the resources is controlled in accordance with an access-control policy specified in a computer-readable access-control language,
  wherein the method is implemented in a user client and includes the steps of:
    submitting an access-token request to an authorization server, which access-token request identifies a user of the user client and relates to said resources;
    receiving an access token from the authorization server;
    submitting the received access token to the resource server; and
    submitting a resource request to the resource server for accessing the resources,
  wherein the access token indicates at least one role associated with the user and at least one explicit permission/restriction to access at least a first one of the resources, wherein each explicit permission/restriction references said first one of the resources directly and each role references at least a second one of the resources only indirectly via the access-control policy.

18. The computer system of claim 2, wherein the static policy privileges are decided on the basis of at least one role which is associated with a user.

19. The computer system of claim 2, wherein the first-type PDP is configured to generate an access token which indicates at least one role associated with a user and at least one explicit permission/restriction to access at least one of the resources, wherein each permission/restriction references said at least one resource directly and each role references the resources only indirectly via the access-control policy.

* * * * *